United States Patent
Richards

[11] 3,822,009
[45] July 2, 1974

[54] ITEM TRANSPORTING SYSTEM
[75] Inventor: James J. Richards, Rochester, N.Y.
[73] Assignee: Eastman Kodak Company, Rochester, N.Y.
[22] Filed: Feb. 1, 1973
[21] Appl. No.: 328,830

[52] U.S. Cl............ 198/40, 198/37, 250/223 R, 340/259
[51] Int. Cl............................. B65g 43/00
[58] Field of Search.......... 198/40, 37, 76; 340/259; 250/223; 318/480

[56] References Cited
UNITED STATES PATENTS
| | | | |
|---|---|---|---|
| 2,916,633 | 12/1959 | Stone et al. | 250/223 |
| 2,966,253 | 12/1960 | Gerrans | 198/37 |
| 3,114,902 | 12/1963 | Tanguy | 340/259 |
| 3,223,225 | 12/1965 | Clark et al. | 198/40 |
| 3,251,452 | 5/1966 | Conway et al. | 198/40 |
| 3,430,751 | 3/1969 | Bateson | 198/37 |
| 3,465,869 | 9/1969 | Benatar | 198/40 |

Primary Examiner—Richard A. Schacher
Assistant Examiner—Jeffrey Nase
Attorney, Agent, or Firm—Norman D. McClaskey

[57] ABSTRACT

An item transporting system is disclosed in which the rate at which packages are deposited on a conveyor is automatically controlled as a function of the backlog of packages awaiting removal from the conveyor. A circuit combines pulses with a repetition rate equal to the package deposit rate, and signals indicating the number of packages awaiting removal from the conveyor to generate feedback signals that control the operating speed of a loading station depositing the packages on the conveyor.

8 Claims, 5 Drawing Figures

ITEM TRANSPORTING SYSTEM

BACKGROUND OF THE INVENTION

1. Field of the Invention

This invention relates to item transporting systems, and more particularly to item transporting systems in which the differential in rates at which items are deposited on and removed from a conveyor is automatically varied as a function of the number of items awaiting removal from the conveyor.

2. Description of the Prior Art

Systems that automatically deposit items on a conveyor and transport them to an unloading station where they are removed from the conveyor are well known. For instance, such systems are commonly used during the assembly and packaging of items and to label and load packages. In order to avoid overloading of the conveyor in prior art systems, it is common practice to maintain a constant rate of item deposit on the conveyor that does not exceed the rate at which items are removed from the conveyor. In essence, the constant rate at which items are deposited on the conveyor is determined by the rate at which items are removed from the conveyor, and this rate is normally also maintained constant.

In many item transporting systems, it is of crucial importance that a conveyor for transporting items not be over-loaded. For instance, in a high-speed transporting system, overloading a conveyor can result in the system being jammed and damaged. Such an interruption of the item transporting system can also effect the operation of the other equipment used in conjunction with the system. In addition to affecting the operation of equipment, overloading the conveyor can also result in damage to the items being transported. One further additional loss resulting from overloading is the machine operating time lost when a system's operation is terminated to clear a portion of the system of jammed items. In summary, overloading of a conveyor in an item transporting system can damage the system, equipment used in conjunction with the system, and the items being transported; and, in addition, result in the loss of valuable machine operating time.

The prior art has attempted to solve this problem by providing apparatus that detects when overloading of a conveyor occurs, and terminates the operation of a transporting system before the overloading reaches the point that the items jam the system. An example of an item transporting system that embodies such apparatus is shown in L. L. Tanguy, Jr., U.S. Pat. No. 3,114,902, issued on Dec. 17, 1963. In this system, the rates at which items are deposited and removed from a conveyor are maintained constant in any subassembly of the system. The system detects overloading by determining the actual time required for items on a conveyor to travel between various stations along the conveyor. Since, theoretically, the rate at which items are introduced into this system, and the rate at which they travel between any two stations, is maintained constant, it is possible to calculate the time required for the items to travel between stations when the system is operating properly. It is then possible to detect overloading, due to, for example, a malfunction that reduces the conveyor operating speed, by comparing the actual travel time for an item between two stations with the calculated time, since such a malfunction will affect the actual travel time. Consequently, when the actual travel time for an item travelling between two stations drops below the calculated travel time, detection apparatus responds by terminating the operation of the system.

Attempts have been made to use systems similar to the Tanguy system, including fixed time delays, to generate feedback signals for controlling the difference between the rates of item deposit on and removal from a conveyor. In such a system, it is necessary to manually change the time delay used when the conveyor speed is changed.

While systems such as the prior art system described above operate adequately, they require the use of expensive apparatus and provide inflexible automatic correction of operating speed to minimize the possibility of a jam occurring. For example, expensive constant speed motors are required for driving the conveyor to avoid variations in the conveyor speed that will give erroneous indications of overloading or jamming. Similarly, the conveyor support and drive assembly must be precisely designed and built to minimize the occurrence of variations in the conveyor speed. Furthermore, the use of fixed time delays in generating signals that control the difference in rates at which items are deposited on and removed from a conveyor reduces the efficiency of a system, since a change in system operating speed requires a change in the time delays used. A change in time delays can result in the operation of a system being interrupted for a significant interval, since time is required to calibrate the system to obtain proper operation with the newly added time delays.

SUMMARY OF THE INVENTION

The invention solves the problems of the prior art by utilizing timing pulses synchronized with the operating speed of a loading station, instead of time delays, to supply the timing information required in detecting when an overload condition exists on a conveyor in an item transporting system. More specifically, control of the difference between the rate of deposit and rate of removal of items in a conveyor system can be accomplished by utilizing pulses generated at a rate equal to the rate at which the loading station is capable of depositing items on the conveyor and signals representing the extent of the backlog of items awaiting removal from the conveyor to generate signals that control the operating speed of either the loading or unloading station. For instance, when there is either no item backlog on the conveyor, or this backlog is low, signals can be generated that result in the loading station depositing items on the conveyor at a relatively high rate. This automatically results in an appropriate increase in the repetition rate of the timing pulses used in detecting the presence of a conveyor overload condition. Conversely, when the item backlog on the conveyor is high, signals can be generated that result in the rate at which the loading station deposits items on the conveyor being reduced, along with an automatic reduction in the repetition rate of the timing pulses, to allow the unloading station time to lower the item backlog. In essence, the invention automatically varies the timing information required in detecting overload conditions on a conveyor in an item transporting system and, therefore, eliminates the need to recalibrate the system when its operating speeds are changed.

A number of advantages accrue from using the invention in an item transporting system. First, less expensive drive motors and conveyor assemblies than required by the prior art systems may be used in a system embodying the invention since small variations in the speed of the conveyor will not produce erroneous indications of overload conditions. Next, such a system operates more efficiently, since there is no need to recalibrate the system when its operating speeds are changed. Additionally, the circuit for implementing the invention is not complex, and it may be constructed of relatively inexpensive components. Finally, the invention may be easily installed on an operating system with very little modification of the system. In summary, incorporating the invention in an item transporting system can result in a system that costs less to build and operates more efficiently than prior art item transporting systems.

It is an object of this invention to reduce the cost of item transporting systems.

It is another object of this invention to increase the operating efficiency of item transporting systems.

It is another object of the invention to allow item transporting systems to be operated over a wide range of speeds without requiring changes and recalibration of conveyor overload detection circuits.

It is a more specific object of this invention to reduce the possibility of overloading an item transporting system to the point that its operation is effected.

It is a still more specific object of this invention to reduce the possibility of jamming an item transporting system by controlling the difference between the rates at which items are deposited on, and removed from, a conveyor in the system as a function of the backlog of items awaiting removal from the conveyor.

DESCRIPTION OF THE ILLUSTRATIVE EMBODIMENT

Figure 1:
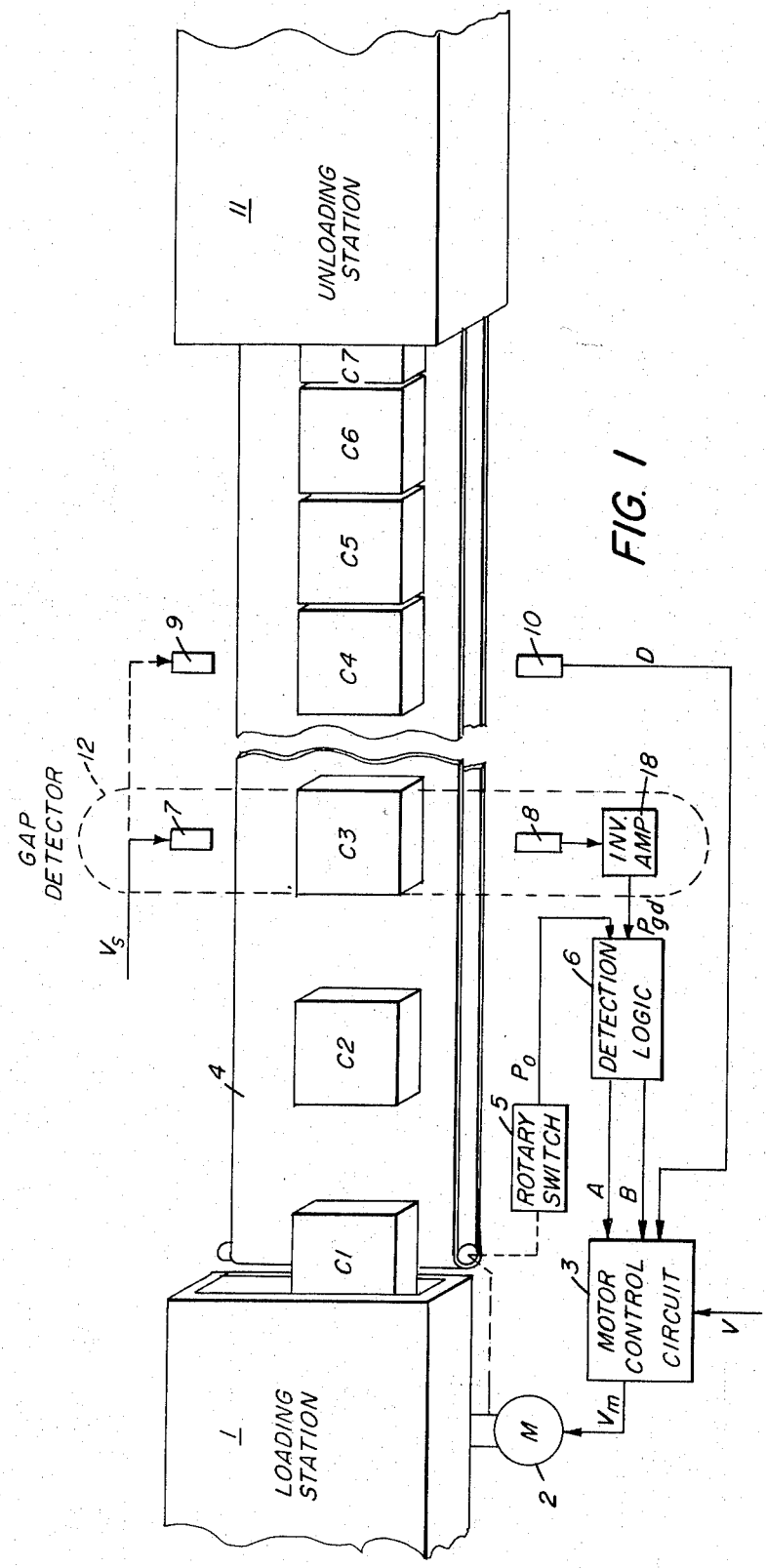
FIG. 1 shows a block diagram of an item transporting system incorporating the invention.

The illustrative system shown in FIG. 1 is used in transporting packages from a loading station 1 to an unloading station 11. The loading station 1 deposits packages on a conveyor 4 at a rate determined by the operating speed of a driving motor 2 and the packages are removed from the conveyor 4 at the unloading station 11 at a rate determined by the operating speed of the unloading station. The conveyor 4 is also driven by the motor 2. The system operates most efficiently when there is a small backlog of packages C4 through C7 awaiting removal from the conveyor 4 by the unloading station 11. This mode of operation ensures that there is always a package to be removed from the conveyor when the unloading station 11 is capable of removing a package.

When operation of the system is initiated, there are no packages on the conveyor 4 (FIG. 1) and, hence, there is nothing in the path between a light source 9 and a photosensor 10. This condition results in the photosensor 10 generating a signal D that is applied to the motor control circuit 3. The motor control circuit 3 responds to this signal by applying power to the motor 2 that results in the motor driving the loading station 1 at a higher operating speed than the operating speed of the unloading station 11. In this situation, the loading station 1 deposits packages on the conveyor at a rate higher than the rate at which packages are removed by the unloading station 11 and a backlog of packages develops at the unloading station. This backlog increases until a package on the conveyor 4 blocks the path between the light source 9 and the photosensor 10. This backlog consists of a first number of packages. When this occurs, the photosensor 10 will cease generating the signal D, and the motor control circuit 3 responds to this condition by reducing the speed of the motor 2, which results in a reduction in the rate at which packages are being deposited on the conveyor 4. This reduction in the rate at which packages are deposited on the conveyor 4 either eliminates or slows the rate at which the backlog increases, depending upon the amount of the reduction.

Figure 3:
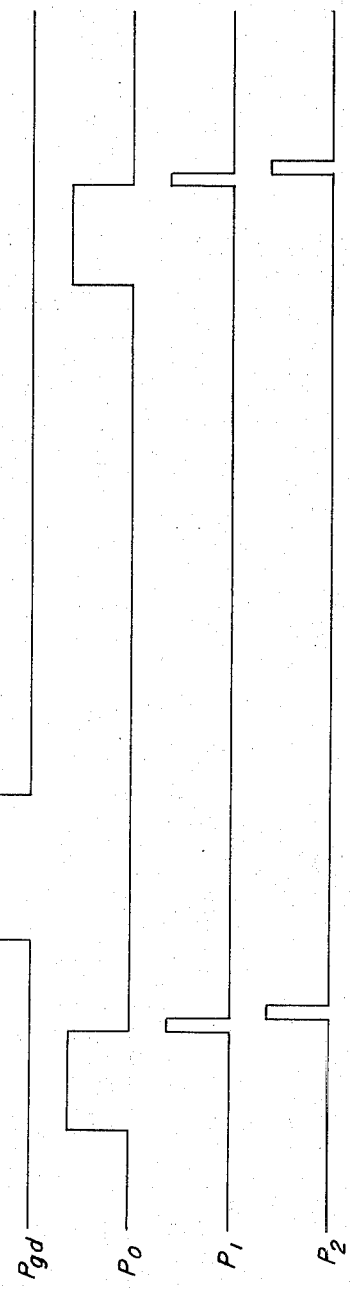
FIG. 3 shows waveforms that are useful in describing the operation of the circuit shown in FIG. 2.

In the case where the backlog of packages continues to increase at the slower rate of package deposit, it will reach a point where any further backlog increase may produce a situation in which there is a danger of jamming the system. This upper limit on allowable package backlog will vary, depending upon the system operating speed, the character of the packages being transported, and the response time of the control circuits and drive apparatus used in the system. As previously mentioned, the detection of the maximum allowable package backlog is accomplished by combining the pulses generated at a rate equal to the rate that packages are deposited on the conveyor 4 (FIG. 1), and the output signals of a gap detector. In the illustrative embodiment, the pulses PO (FIG. 3) are generated by a rotary switch 5 that is mechanically connected to the conveyor. The design of the rotary switch 5 is such that the pulses PO it generates have a repetition rate equal to the rate at which the loading station, at its current operating speed, is capable of depositing packages on the conveyor 4 and these pulses are applied to detection logic 6.

The gap detector 12 (FIG. 1) is a photoelectric circuit that includes a light source 7 and a photosensor 8. In the illustrative embodiment, maximum backlog occurs when the packages awaiting removal are backed up to the point that the path between the light source 7 and photosensor 8 is blocked. When the backlog of packages is less than the maximum allowable backlog, packages will be moving between this light source-photosensor pair in the gap detector 12, and this will result in pulses Pgd (FIG. 3) appearing at the output of the inverting amplifier 18 between the occurrence of each pulse PO generated by the rotary switch 5. The gap detector pulses Pgd are also applied to the detection logic 6 and when one of them occurs, this indicates that the package backlog is less than the maximum allowable backlog. In this case, the detection logic 6 will generate an output signal A, indicating that there is no need to reduce the operating speed of the loading station 1. When the maximum allowable package backlog is reached on the conveyor 4, consisting of a second number of packages, the path between the light source 7 and the photosensor 8 will be blocked and there will be no output signals Pgd from the gap detector 12. In this case, the detection logic 6 responds to the absence of an output signal from the gap detector 12 for a period equal to the interval between two of the rotary switch pulses P0 by generating a signal B that is applied to the motor control circuit 3. The motor control circuit 3 responds to the initial application of the signal B by reducing the power applied to the motor 2, and this results in a reduction in the rate at which the loading station deposits packages on the conveyor 4. The purpose of this reduction in the rate at which the loading station 1 deposits packages on the conveyor 4 is to allow the unloading station 11 time to reduce the package backlog below the maximum allowable level.

If the backlog has not been reduced below the maximum level by the time the next rotary switch pulse P0 occurs, no gaps will be detected between this and the preceeding pulses, and the detection logic 6 (FIG. 1) will continue to generate the signal B. The motor control circuit will not respond again to this signal B by further reducing the motor speed for a selected interval, since there is a time lag between a reduction in the deposit rate of packages and the reduction of a backlog. After this selected interval expires, the motor control circuit will respond to the signal B to further reduce the speed of the motor 2 and, hence, reduce the deposit rate of packages. In essence, the deposit rate of packages is initially reduced by a certain amount to reduce the package backlog, and if this reduction is not sufficient to reduce the backlog below the maximum allowable level within a selected interval, the package deposit rate is further reduced. Any over-reduction in the package deposit rate is detected when the backlog of packages drops to a level such that the path between the light source 9 and the photosensor 10 is clear. As previously mentioned, when this occurs, the photosensor 10 generates a signal D that results in the motor control circuit 3 increasing the speed of the motor 2 and the rate at which packages are being deposited on the conveyor 4. This ensures that a minimum package backlog is maintained on the conveyor. By maintaining a backlog of packages on the conveyor 4 between a minimum and a maximum level in the manner described above, efficient use of the system is achieved, with little possibility of overloading the conveyor to the point that jamming of the system may occur.

Figure 2:
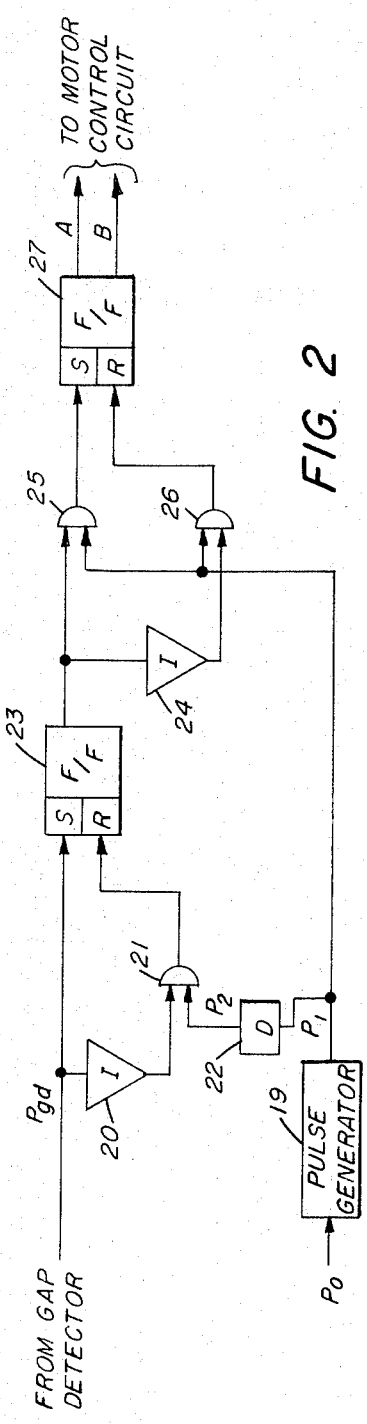
FIG. 2 shows a detailed block diagram of detection logic shown in FIG. 1.

Detection logic 6 (FIG. 1) suitable for use with the gap detector 12 is shown in detail in FIG. 2. The output pulses P0 (FIG. 3) of the rotary switch 5 (FIG. 1), generated at the same rate as the rate at which packages are deposited on the conveyor 4, are applied to a pulse generator 19 (FIG. 2). This pulse generator 19 detects the lagging edge of a pulse P0 and generates a timing pulse P1. The pulse P1 is applied to the AND gates 25 and 26 to indicate the expiration of an interval equal to the interval between successive output pulses P0 of the rotary switch 5. The output Pgd (FIG. 3) in the gap detector 12 (FIG. 1) is applied to the set side of a flip-flop 23 (FIG. 2) and the inverter 20. The occurrence of a pulse Pgd sets the flip-flop 23. It will be recalled that when the gap detector 12 generates a pulse Pgd, this indicates that packages are moving past the gap detector and, therefore, the package backlog on the conveyor 4 has not reached the maximum allowable level. If the flip-flop 23 is set when the pulse generator 19 generates the pulse P1, the gate 25 is enabled, and the flip-flop 27 is set. This results in the previously mentioned signal A being generated to indicate that the backlog has not reached its maximum allowable level. After the gate 25 is enabled, a pulse P2 appears at the output of a delay 22 and it is applied as an input to the AND gate 21. The other input to this AND gate 21 is the inverted signal level at the output of the gap detector 12 (FIG. 1). If no gap is being detected at this time, this signal level is a "0," and the inverter 20 output is a "1," which is applied as a second input to the AND gate 21. The simultaneous application of "1" to each of the inputs of the gate 21 enables the gate, and results in the flip-flop 23 being reset in preparation for use in recording the detection of a gap before the next pulse P0 is generated by the rotary switch 5 (FIG. 1). The inverter 20 and the gate 21 are included in the detection logic to ensure that the flip-flop 23 records a gap detected at the time that the pulse P2 appears at the output of the delay 22. If there is a "1" output from the gap detector 12 at the time the pulse P2 appears as an output of the delay 22, indicating the presence of a gap in packages, the gate 21 will not be enabled and the flip-flop 23 will not be reset.

If no gaps are detected between the occurrence of a first and a second output P0 of the rotary switch 5 (FIG. 1), indicating that the maximum package backlog has been exceeded, the flip-flop 23 will not be set after being reset by the occurrence of the first pulse P2. Consequently, when the second P0 pulse is applied to the pulse generator 19, and a second pulse P1 is applied to the gates 25 and 26, the set side of the flip-flop 23 will contain a "0." In this case, the "0" output of the set side of the flip-flop 23 is converted to a "1" by the inverter 24 and applied as an input to the gate 26. The simultaneous application of this "1" and the pulse P1 = 1 to the gate 26 enables the gate, and results in the flip-flop 27 being reset. Resetting this flip-flop 27 results in the generation of the previously mentioned signal B, which indicates that the minimum package backlog has been exceeded, and the rate at which packages are deposited on the conveyor 4 is to be reduced.

Figure 5:
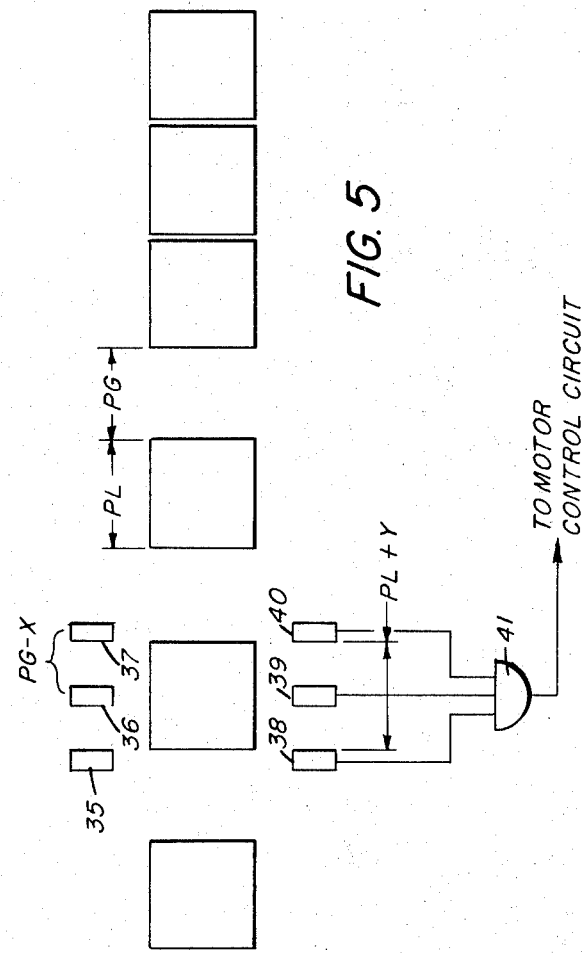
FIG. 5 shows an arrangement of light source-photosensor pairs that is useful in describing the operation of the system shown in FIG. 1.

If a gap detector of the design shown in FIG. 5 is used, the detection logic shown in FIG. 2 is not required in the system. In the arrangement shown in FIG. 5, a set of light sources 35 through 37 and photosensors 38 through 40 are arranged such that the distance PL + Y between the end light sources and the distance between the end photosensors slightly exceeds the package length PL. The distance PG − X between any pair of light sources or photosensors is selected such that it is slightly less than the normal gap PG between packages on the conveyor 4. With this arrangement, there will be an output from at least one of the photosensors 38 through 40, unless the backlog has exceeded the maximum allowable backlog, resulting in the paths between all of the light source-photosensor pairs being blocked by the backlog. The output of each of the photosensors is applied as an input to an OR gate 41. When a gap is detected by this gap detector, the OR gate 41 will be enabled, and generate a signal A = 1, indicating that the rate of depositing packages on the conveyor does not need to be reduced since the maximum package backlog has not been exceeded. Conversely, when the maximum package backlog is exceeded, there will be no outputs from the photosensors 38 through 40, and the OR gate 41 will not be enabled. This results in a signal B = 0 output from the gate 41, which indicates that a reduction in the rate at which packages are deposited on the conveyor is required.

Figure 4:
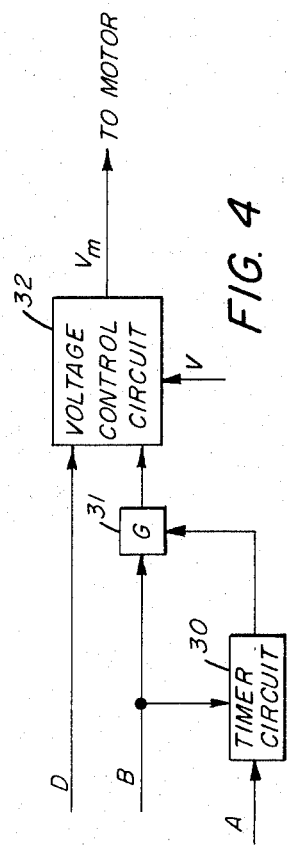
FIG. 4 shows a block diagram of a motor control circuit shown in FIG. 1.

A detailed block diagram of the motor control circuit 3 (FIG. 1) is shown in FIG. 4. The output D of the photosensor 10 (FIG. 1), indicating when the minimum package backlog has been achieved, is applied as an input to a voltage control circuit 32 (FIG. 4). It will be recalled that when less than the minimum backlog of packages is on the conveyor 4, the signal D = 1, and this results in a relatively high level of power being applied to the motor 2 to increase the rate at which packages are deposited on the conveyor 4 to a selected level. The voltage control circuit 32 may be any one of a number of well-known control circuits such as, for example, a variable voltage supply whose output $V_M$ is controlled by a switch that responds to input signals. In this case, the signal D = 1 results in the voltage $V_M$ being increased to a selected level. Another input to the motor control circuit 3 is the signal B which indicates that the maximum allowable package backlog has been exceeded and a reduction in the rate at which packages are deposited on the conveyor 4 is required. The initial application of the signal B enables a gate 31 (FIG. 4) which results in the voltage $V_M$ being reduced by a selected amount and the enabling of a timer circuit 30. The enabled timer circuit 30 generates a signal that disables the gate 31 for a selected interval to ensure that the signal B is not applied again to the voltage control circuit 32 until a reduction in the package backlog is achieved as a result of the initial reduction in the rate of package deposit on the conveyor. When this interval expires, the timer circuit 30 resets itself and removes the disable signal from the gate 31. At this point, if the existing backlog still exceeds the maximum allowable backlog, the signal B is again applied to the voltage control circuit 32 via the gate 31, which is enabled by the resetting of the timer circuit 30, resulting in the voltage $V_M$ used to drive the motor reduced by a selected amount to further reduce the rate at which packages are deposited on the conveyor. Additionally, the timer circuit 30 is again enabled by the signal B after being reset. Once the package backlog has been reduced to a level below the maximum allowable backlog level, the detection logic will generate the signal A instead of the signal B, and this results in the timer circuit 30 being reset. In this situation, the timer circuit 30 will remain reset, and there will be no further reduction in the voltage $V_M$ applied to the motor 2, since the signal B is no longer present as an input to the motor control circuit.

In summary, the foregoing has described the operation of an illustrative item transporting system in which a differential in the rate at which items are deposited and removed from a conveyor is automatically controlled as a function of the backlog of items awaiting removal from the conveyor. This mode of operation ensures that the item backlog on the conveyor does not reach a level sufficient to interfere with the operation of the system. It is clear that, in view of this description, numerous modifications and adaptations of the illustrative embodiment within the spirit and scope of the invention will be apparent to one skilled in the art.

What is claimed is:

1. In an item transporting system including a loading station for depositing items on a conveyor, a conveyor, and an unloading station for removing items from the conveyor, the combination comprising:

means for generating signals with a repetition rate related to the operating speed of said loading station, means for detecting the existence of a backlog of said items, awaiting removal from said conveyor, of a selected magnitude, and control means responsive to said signals and the detected backlog of said items for generating control signals indicating the variation required in the difference between the operating speeds of said loading and unloading stations to reduce said backlog.

2. The system of claim 1, further comprising:

driving means for operating said loading station; wherein said driving means is responsive to said control signals for varying the operating speed of said loading station.

3. In an item transporting system including a loading station for depositing items on a conveyor, a conveyor, and an unloading station for removing items from the conveyor, the combination comprising:

means for generating signals representing the rate at which said loading station is depositing items on said conveyor at said loading station's current operating speed, means for detecting the existence of a backlog of said items awaiting removal from said conveyor including a first number of said items, and means responsive to said signals and the detected backlog of said items for reducing the operating speed of said loading station to a first level.

4. The system of claim 3, further comprising:

means for detecting the existence of a backlog of said items awaiting removal from said conveyor including a second number of said items, and means responsive to said signals and the detected backlog including said second number of said items for reducing the operating speed of said loading station to a second level.

5. The system of claim 3 wherein said means for generating signals further comprises:

signalling means mechanically connected to said conveyor for generating electrical pulses with a repetition rate equal to the rate at which said loading station is depositing items on said conveyor at a given operating speed.

6. In an item transporting system including a loading station, a conveyor, and an unloading station, the combination comprising:

means for generating pulses with a repetition rate equal to the rate at which said loading station deposits items on said conveyor, detection means positioned at a selected point along said conveyor for generating a selected signal level when no gaps are detected between said items at said point on said conveyor, means responsive to said pulses for generating timing pulses, a first circuit responsive to said timing pulses and the signal generated by said detection means for generating an output signal indicating the absence of said gaps, a second circuit responsive to the output signal of said first circuit and said timing pulses for generating a control signal, and means responsive to said control signal for varying the difference between the rate at which said items are deposited on and removed from said conveyor.

7. The item transporting system of claim 6 wherein said first circuit comprises:
   delay means for delaying said timing pulses a selected interval,
   a logic circuit responsive to a delayed timing pulse and said signal level generated by said detection means for generating a selected signal, and
   a bi-stable device responsive to the selected signal generated by said logic circuit for generating said output signal indicating the absence of gaps between said items.

8. The item transporting system of claim 6 wherein said second circuit comprises:
   a logic circuit responsive to the output of said first circuit and said timing pulses for generating a selected signal, and
   a bi-stable device responsive to the selected signal generated by said logic circuit for generating said control signal.

* * * * *